United States Patent
Abe et al.

[11] Patent Number: 6,055,879
[45] Date of Patent: May 2, 2000

[54] HYDRAULIC CONTROL SYSTEM FOR AUTOMATIC TRANSMISSION OF MULTIPLE CLUTCH TYPE WHICH PREVENTS TWO CLUTCHES FROM BEING SIMULTANEOUSLY ENGAGED

[75] Inventors: Akiharu Abe, Toyota; Kojiro Kuramochi, Numazu; Masafumi Kinoshita, Toyota; Ryoji Habuchi, Okazaki, all of Japan

[73] Assignee: Toyota Jidosha Kabushiki Kaisha, Toyota, Japan

[21] Appl. No.: 08/833,739

[22] Filed: Apr. 9, 1997

[30] Foreign Application Priority Data

Apr. 16, 1996 [JP] Japan .................................. 8-093918

[51] Int. Cl.⁷ .................................................. F16D 48/02
[52] U.S. Cl. .......................... 74/335; 74/330; 192/87.18; 192/87.15
[58] Field of Search .................... 477/127, 143, 477/156, 906; 74/330, 335; 192/87.15, 87.18, 87.14

[56] References Cited

U.S. PATENT DOCUMENTS

| | | | |
|---|---|---|---|
| 5,006,093 | 4/1991 | Itoh et al. ........................ | 474/111 |
| 5,050,715 | 9/1991 | Itoh et al. ........................ | 192/3.3 |
| 5,052,247 | 10/1991 | Kato et al. ....................... | 477/49 |
| 5,067,603 | 11/1991 | Kato et al. ....................... | 477/39 |
| 5,086,672 | 2/1992 | Kato et al. ....................... | 477/41 |
| 5,305,664 | 4/1994 | Wakahara ......................... | 477/127 |
| 5,527,233 | 6/1996 | Tabata et al. ..................... | 477/62 |

FOREIGN PATENT DOCUMENTS

| | | |
|---|---|---|
| 0 713 987 | 5/1996 | European Pat. Off. . |
| 61-256048 | 11/1986 | Japan ............................ 477/906 |
| 63-31031 | 6/1988 | Japan . |
| 1-216152 | 8/1989 | Japan ............................ 192/87.14 |
| 1-247849 | 10/1989 | Japan ............................ 477/127 |
| 2-134457 | 5/1990 | Japan ............................ 477/127 |

OTHER PUBLICATIONS

Patent Abstracts of Japan, vol. 7, No. 31 (M–192), Feb. 8, 1983, JP 57–184730, Nov. 13, 1982.

*Primary Examiner*—Charles A Marmor
*Assistant Examiner*—Ankur Parekh
*Attorney, Agent, or Firm*—Oblon, Spivak, McClelland, Maier & Neustadt, P.C.

[57] ABSTRACT

A hydraulic control system for an automatic transmission of multiple clutch type, in which a switchover valve (2 in FIG. 4) for switching-over clutch control pressures includes two spool valvules (4 and 6). When one of two clutches (C1 and C2) is supplied with the clutch control pressure and is held in engagement, the spool valvules (4 and 6) operate to cut off the supply of the clutch control pressure for the other clutch to-be-disengaged and to hold the engagement of one clutch to-be-engaged. Thus, even when the supply source (12 or 14) of the clutch control pressure has failed, the clutches (C1 and C2) are prevented from coming into multiple engagement.

3 Claims, 5 Drawing Sheets

FIG.2

| GEAR | C1 | C2 | S1 | | S2 | | SR |
|---|---|---|---|---|---|---|---|
| | | | 1 | 3 | 2 | 4 | |
| REVERSE GEAR | | ○ | ○ | | | | ○ |
| 1ST GEAR | ○ | | ○ | | | | |
| 2ND GEAR | | ○ | | | ○ | | |
| 3RD GEAR | ○ | | | ○ | | | |
| O/D GEAR | | ○ | | | | ○ | |

HYDRAULIC CONTROL SYSTEM FOR AUTOMATIC TRANSMISSION OF MULTIPLE CLUTCH TYPE WHICH PREVENTS TWO CLUTCHES FROM BEING SIMULTANEOUSLY ENGAGED

BACKGROUND OF THE INVENTION

1. Field of the Invention

The present invention relates to an automatic transmission for a motor vehicle, and more particularly to a hydraulic control system for an automatic transmission of multiple clutch type.

2. Description of the Prior Art

The official gazette of Japanese Patent Application Publication No. 31031/1988 discloses a hydraulic control system for an automatic transmission of multiple clutch type for use in a motor vehicle, the automatic transmission effecting so-called "clutch-to-clutch gear shifts". The automatic transmission has two power transmission shafts each of which transmits power from a driving source to driving wheels. The respective power transmission shafts are connected or disconnected on power transmission paths by correspondent clutches. The clutches are engaged or released by clutch oil pressures which are controlled by solenoid valves etc. Thus, one of the clutches is released from its engaged state, and the other is engaged from its released state, whereby the clutches are selectively brought into engagement so as to attain a plurality of gear shift stages.

In the hydraulic control system for the multiple clutch type automatic transmission as explained above, the solenoid valve for controlling the clutch oil pressure is usually set "normally-open". This is intended to prevent the drawback that, when the solenoid valve has failed, the automatic transmission falls into its neutral state, so the motor vehicle becomes incapable of drive.

The normally-open solenoid valve, however, poses the problem that, when it has failed due to breaking of wire or the like, the two clutches might come into multiple engagement to simultaneously have power transmission capabilities and to lock the motor vehicle.

SUMMARY OF THE INVENTION

The present invention has been made in view of the problem in the prior art, and it has for its object to provide a hydraulic control system for an automatic transmission of multiple clutch type in which, even when a solenoid valve being the supply source of a clutch control pressure has failed, clutches can be prevented from coming into multiple engagement.

The present invention has achieved the above object by adopting a structure wherein while a second clutch is held in engagement, a first spool valvule included in a switchover valve cuts off the supply of a clutch control pressure for a first lutch by the use of the clutch control pressure of the second clutch. Likewise, while the first clutch is held in engagement, a second spool valvule cuts off the supply of a clutch control pressure for the second clutch by the use of the clutch control pressure of the first clutch.

Further, in a case where one clutch (first clutch or second clutch) and the other clutch (second clutch or first clutch) are both supplied with the clutch control pressures and are simultaneously controlled, the spool valvules operate to preferentially supply the clutch control pressure to one clutch only, to bring this clutch into engagement, and to cut off the supply of the clutch control pressure for the other clutch.

Thus, even in a case, for example, where a normally-open solenoid valve has failed and remained open, and where the clutch control pressure has continued to act on the switchover valve, the spool valvules function to engage only one clutch without engaging the other clutch. It is therefore possible to prevent, at least, the first and second clutches from coming into multiple engagement.

Needless to say, the principle of the present invention as elucidated above is also applicable to an automatic transmission of multiple clutch type having three or more power transmission shafts and having three or more correspondent clutches.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 2 is a table showing the engagement states of clutches and sleeves in the cases of selecting respective speed stages;

DETAILED DESCRIPTION OF THE PREFERRED EMBODIMENTS

Now, examples of the aspects of performance (embodiments) of the present invention will be described in detail with reference to the drawings.

Figure 1:
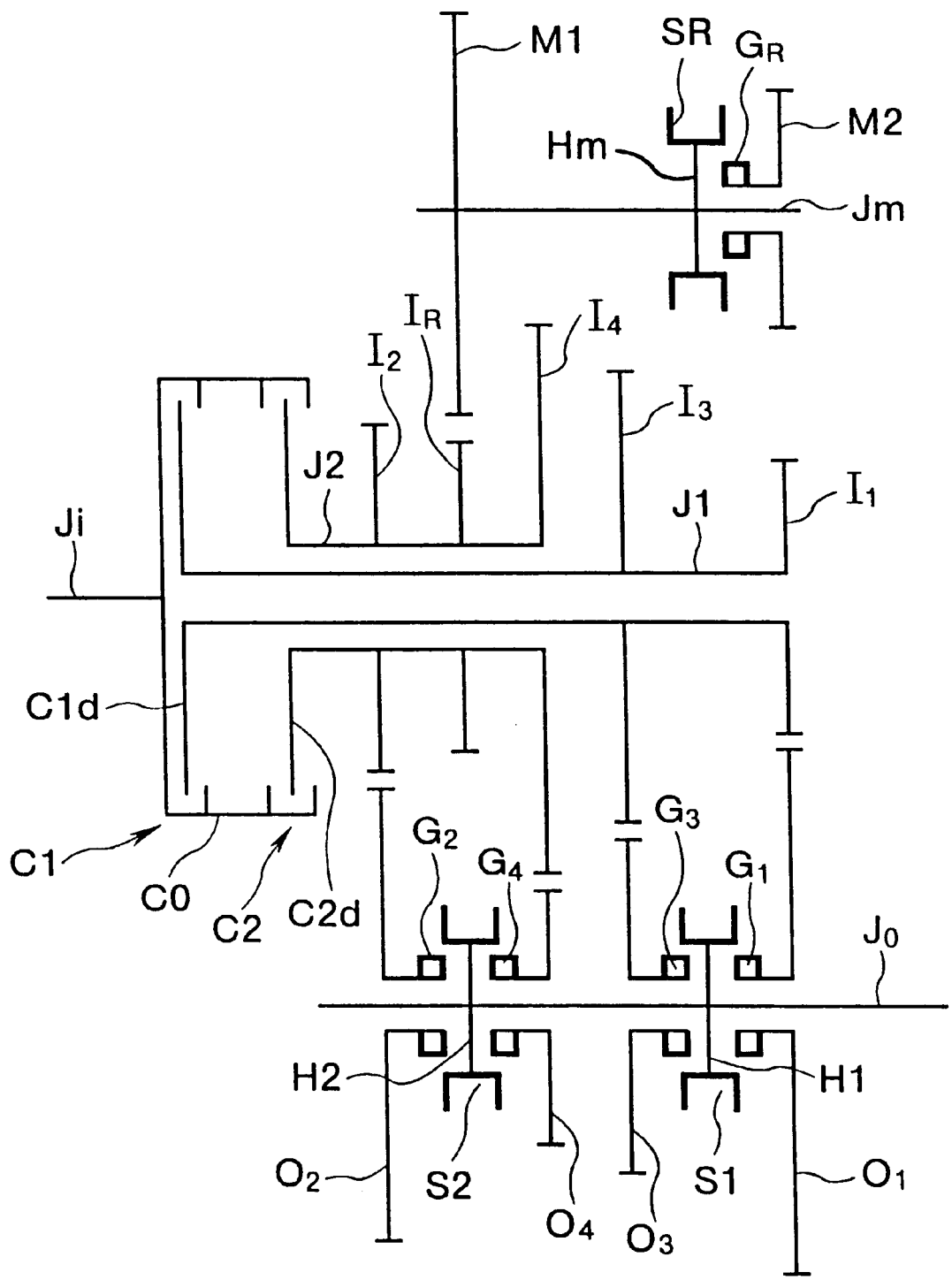
FIG. 1 is a skeleton diagram showing the power transmission system of a multiple clutch type automatic transmission to which the present invention is applied.

FIG. 1 is a skeleton diagram showing the power transmission system of a multiple clutch type automatic transmission to which the present invention is applied.

The multiple clutch type automatic transmission for a motor vehicle has first and second output shafts (power transmission shafts) J1 and J2 each of which transmits power from an unshown engine (driving source) to unshown driving wheels. The automatic transmission also has first and second clutches C1 and C2 which connect or disconnect the first and second output shafts J1 and J2 on power transmission paths, respectively.

In the aspect of performance depicted in FIG. 1, symbol Ji denotes a transmission input shaft, which is joined to a clutch outer-block member CO being common to the first and second clutches C1 and C2. Symbols C1d and C2d denote the discs of the first and second clutches C1 and C2, respectively. The discs C1d and C2d are individually or independently connected to or disconnected from the clutch outer-block member CO.

The first output shaft J1 is joined to the disc C1d of the first clutch C1, while the second output shaft J2 is joined to the disc C2d of the second clutch C2. In this aspect of performance, the first output shaft J1 is disposed inside the second output shaft J2 being hollow. That is, the first and second output shafts J1 and J2 are adapted to rotate round an shown common central axis.

The first output shaft J1 carries a first-speed-stage (first-gear) drive gear $I_1$ and a third-speed-stage (third-gear) drive gear $I_3$ which correspond to speed change gears, and which are unrotatably (fixedly) mounted on this shaft J1. Also the second output shaft J2 carries a second-speed-stage (second-gear) drive gear $I_2$, a fourth-speed-stage (overdrive-gear) drive gear $I_4$ and a reverse-stage (reverse-gear) drive gear $I_R$, which correspond to speed change gears, and which are unrotatably (fixedly) mounted on this shaft J2. Here, on the second output shaft J2, the reverse-stage drive gear $I_R$ is mounted between the second-speed-stage drive gear $I_2$ and the fourth-speed-stage drive gear $I_4$ in order to shorten the axial dimension of the automatic transmission.

Symbol Jo denotes a transmission output shaft, the central axis (not shown) of which is parallel to the common central axis of the first output shaft J1 and the second output shaft J2. The transmission output shaft Jo carries a first-speed-stage driven gear $O_1$, a second-speed-stage driven gear $O_2$, a third-speed-stage driven gear $O_3$ and a fourth-speed-stage driven gear $O_4$, which are rotatably mounted on this shaft Jo in an order as shown in the figure. In addition, a first hub H1 and a second hub E2 are rotatably mounted between the first-speed-stage driven gear $O_1$ and the third-speed-stage driven gear $O_3$, and between the second-speed-stage driven gear $O_2$ and the fourth-speed-stage driven gear $O_4$, respectively.

The first-speed-stage driven gear $O_1$, second-speed-stage driven gear $O_2$, third-speed-stage driven gear $O_3$ and fourth-speed-stage driven gear $O_4$ are always held in mesh with the first-speed-stage drive gear $I_1$, second-speed-stage drive gear $I_2$, third-speed-stage drive gear $I_3$ and fourth-speed-stage drive gear $I_4$, respectively.

A first-speed-stage clutch gear $G_1$, second-speed-stage clutch gear $G_2$, third-speed-stage clutch gear $G_3$ and fourth-speed-stage clutch gear $G_4$ are mounted on the transmission output shaft Jo so as to rotate unitarily with the first-speed-stage driven gear $O_1$, second-speed-stage driven gear $O_2$, third-speed-stage driven gear $O_3$ and fourth-speed-stage driven gear $O_4$, respectively.

Meanwhile, symbols S1 and S2 denote first and second sleeves (changeover elements), respectively, which serve to select any of the speed change gears and to render the selected gear capable of transmitting the power. The first sleeve S1 is mounted on the outer periphery of the first hub H1 so as to be axially movable and to be unrotatable. When the first-speed stage or reverse stage of the automatic transmission has been selected, the first sleeve S1 brings the first hub H1 into engagement with the first-speed-stage clutch gear $G_1$ provided on the first-speed-stage driven gear $O_1$, thereby to join this driven gear $O_1$ to the transmission output shaft Jo. Besides, when the third-speed-stage has been selected, the first sleeve S1 brings the first hub H1 into engagement with the third-speed-stage clutch gear $G_3$ provided on the third-speed-stage driven gear $O_3$, thereby to join this driven gear $O_3$ to the transmission output shaft Jo.

On the other hand, the second sleeve S2 is mounted on the outer periphery of the second hub H2 so as to be axially movable and to be unrotatable. When the second-speed-stage of the automatic transmission has been selected, the second sleeve S2 brings the second hub H2 into engagement with the second-speed-stage clutch gear $G_2$ provided on the second-speed-stage driven gear $O_2$, thereby to join this driven gear $O_2$ to the transmission output shaft Jo. Besides, when the fourth-speed-stage has been selected, the second sleeve S2 brings the second hub H2 into engagement with the fourth-speed-stage clutch gear $G_4$ provided on the fourth-speed-stage driven gear $O_4$, thereby to join this driven gear $O_4$ to the transmission output shaft Jo.

Not only the first sleeve S1 and second sleeve S2, but also a reverse-stage sleeve SR to be explained later plays the role of a changeover element. Each of the changeover elements operates to selectively couple the corresponding clutch gear and hub while synchronizing the rotation of the clutch gear with that of the hub (that of the corresponding shaft).

Symbol Jm denotes a jackshaft (sub-shaft), the central axis (not shown) of which is parallel to the common central axis of the first output shaft J1 and second output shaft J2 and the central axis of the transmission output shaft Jo.

A first intermediate gear M1 and a jackshaft hub Hm are unrotatably mounted on the jackshaft Jm, and a second intermediate gear M2 is rotatably mounted thereon. The first intermediate gear M1 and second intermediate gear M2 are always held in mesh with the reverse-stage drive gear IR and first-speed-stage driven gear $O_1$, respectively.

The jackshaft hub Hm is arranged between the first intermediate gear M1 and the second intermediate gear M2 in order to shorten the axial dimension of the automatic transmission. The reverse-stage sleeve SR is mounted on the outer periphery of the jackshaft hub Hm so as to be axially slidable and to be unrotatable. Shown at symbol GR is the reverse-stage clutch gear, which is selectively engaged with the jackshaft hub Hm through the reverse-stage sleeve SR. The reverse-stage clutch gear $G_R$ is mounted on that axial side of the second intermediate gear M2 which is closer to the first intermediate gear M1, in order to shorten the axial dimension as in the foregoing.

When the reverse stage of the automatic transmission has been selected, the reverse-stage sleeve SR brings the jackshaft hub Hm into engagement with the reverse-stage clutch gear $G_R$ provided on the second intermediate gear M2, thereby to join this gear M2 to the jackshaft Jm.

FIG. 2 tabulates the engagement states of the clutches and sleeves relevant to the individual gear shift stages in the cases where the respective gear shift stages have been selected in this aspect of performance. In the table, mark ○ indicates that the clutch or sleeve lies in its engaged state. Besides, abbreviation O/D signifies "overdrive".

By way of example, at the 1st gear (first-speed stage), the first clutch C1 and the position "1" of the first sleeve S1 bear the marks ○. This indicates that the first clutch C1 is held in engagement, and that the first sleeve S1 holds the first-speed-stage clutch gear $G_1$ and the first hub H1 in engagement.

On this occasion, the power is transmitted along the following path, which shall be denoted by only the symbols for the sake of brevity:

$$Ji \rightarrow CO \rightarrow C1d \rightarrow J1 \rightarrow I_1 \rightarrow O_1 \rightarrow G_1 \rightarrow S1 \rightarrow H1 \rightarrow Jo$$

(S1 is shifted to G1 side so as to hold $G1_1$ and H1 into engagement)

The path of the power transmission for the selection of any other gear (any other speed stage) is similar, and shall be omitted from description.

In this manner, the first and second clutches C1, C2 are selectively engaged by clutch control pressures, thereby to attain a plurality of gear shift stages. A hydraulic control system for controlling the clutch control pressures will be explained below.

Figure 3:
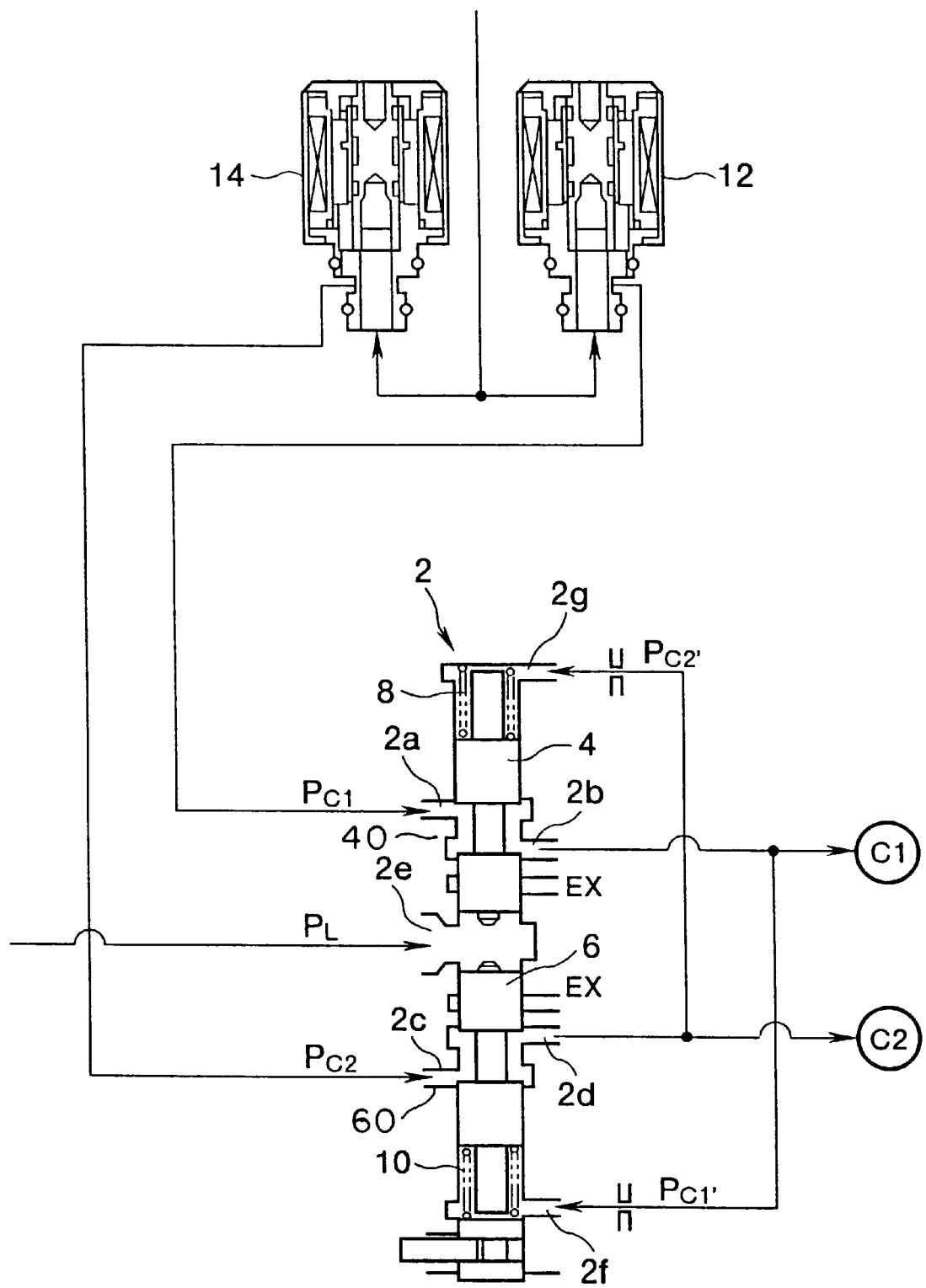
FIG. 3 is a circuit diagram schematically showing the hydraulic control system of the multiple clutch type automatic transmission in the aspect of performance illustrated in FIG. 1.

FIG. 3 is a circuit diagram schematically showing the hydraulic control system of the multiple clutch type automatic transmission in this aspect of performance.

Referring to FIG. 3, a switchover valve assembly 2 includes a first switchover valve 40 with a first spool valvule 4 as well as a second switchover valve 60 with a second spool valvule 6, and a first spring 8 as well as a second spring 10. The first spool valvule 4 and second spool valvule 6 execute the inversion between the supply and cutoff of the clutch control pressures PC1 and PC2 for the first clutch C1 and second clutch C2, respectively.

The clutch control pressures PC1 and PC2 are respectively supplied from solenoid valves 12 and 14 (supply sources of the clutch control pressures). More specifically, the clutch control pressure PC1 for the first clutch C1 is supplied into the first port 2a of the switchover valve assembly 2 by the solenoid valve 12 and then supplied from the port 2b of the switchover valve assembly 2 to the first clutch C1. On the other hand, the clutch control pressure PC2 for the second clutch C2 is supplied into the second port 2c of the switchover valve assembly 2 by the solenoid valve 14 and then supplied from the port 2d of the switchover valve assembly 2 to the second clutch C2.

The urging force Fsp1 of the first spring 8 acts on he first spool valvule 4 in the direction of cutting off the clutch control pressure PC1 for the first clutch C1. Likewise, the urging force Fsp2 of the second spring 10 acts on the second spool valvule 6 in the direction of cutting off the clutch control pressure PC2 for the second clutch C2.

In addition, the port 2e of the switchover valve assembly 2 is supplied with a line pressure $P_L$. The line pressure $P_L$ acts in the directions of countering the urging forces of the first and second springs 8, 10. A pressing force Fp1 based on the line pressure $P_L$ is related with the respective urging forces Fsp1 and Fsp2 based on the first and second springs 8 and 10, as indicated by the following inequalities (1) and (2):

$$Fp1<Fsp1 \tag{1}$$

$$Fp1>Fsp2 \tag{2}$$

Besides, the port 2f of the switchover valve assembly 2 is supplied with a clutch control pressure PC1' for the first clutch C1 as delivered from the port 2b. The clutch control pressure PC1' which is supplied into the port 2f, acts in the same direction as that of the urging force Fsp2 of the second spring 10.

In the state in which the first clutch C1 has a power transmission capability, a pressing force Fpc1' based on the clutch control pressure PC1' satisfies a relation as indicated by the following inequality (3):

$$Fp1<Fsp2+Fpc1' \tag{3}$$

Besides, the port 2g of the switchover valve assembly 2 is supplied with a clutch control pressure PC2' for the second clutch C2 as delivered from the port 2d. The clutch control pressure PC2' which is supplied into the port 2g, acts in the same direction as that of the urging force Fsp1 of the first spring 8. In the state in which the second clutch C2 has a power transmission capability, a pressing force Fpc2' based on the clutch control pressure PC2' satisfies a relation as indicated by the following inequality (4):

$$Fp1<Fsp1+Fpc2' \tag{4}$$

Moreover, the first and second springs 8, 10 are set so that a difference is afforded between the urging force Fsp1 of the first spring 8 and the urging force Fsp2 of the second spring 10, in order that either of the following inequalities (5) and (6) may hold:

$$Fsp1<Fsp2 \tag{5}$$

$$Fsp1>Fsp2 \tag{6}$$

The operation of this aspect of performance will be explained below.

When the first clutch C1 and the second clutch C2 are both in the released states, the first spool valvule 4 and the second spool valvule 6 are respectively pushed upwards and downwards (as viewed in FIG. 3) as illustrated in the figure, in conformity with the relational inequalities (1) and (2) between the pressing force Fp1 of the line pressure $P_L$ and the urging force Fsp1 of the first spring 8 and between the former Fp1 and the urging force Fsp2 of the second spring 10. Accordingly, the first port 2a and port 2b of the switchover valve assembly 2 are held in communication, while the second port 2c and port 2d are held in communication.

Figure 4:
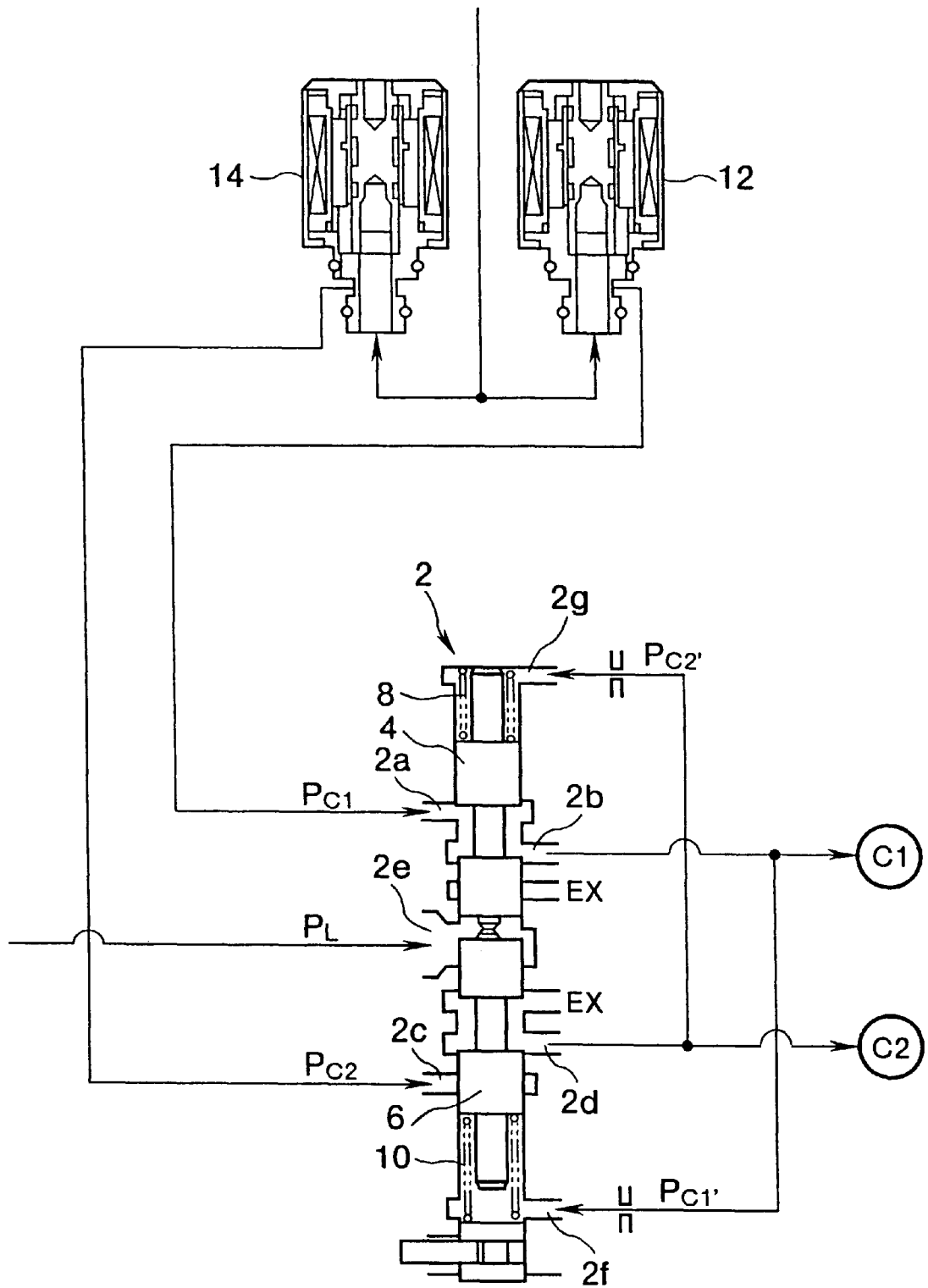
FIG. 4 is a circuit diagram showing the state in which a first clutch is held engaged in the above aspect of performance.

Here, in the engaged state of the first clutch C1, the clutch control pressure PC1' is introduced into the first clutch C1, and the same pressure simultaneously acts on the port 2f. Thus, the second spool valvule 6 is shifted upwards as illustrated in FIG. 4, in conformity with the relational inequality (3) of the forces acting on the second spool valvule 6. Therefore, the communication between the second port 2c and the port 2d is cut off.

That is, when the first clutch C1 is held in the engaged state by the clutch control pressure PC1', the second spool valvule 6 is held at a position adapted to cut off the supply of the clutch control pressure PC2' for the second clutch C2. Further, the second clutch C2 is not engaged, and the first spool valvule 4 is held at a position adapted to supply the clutch control pressure PC1' for the first clutch C1.

Accordingly, even when the solenoid valve 14 has failed on this occasion, the second clutch C2 does not come into engagement because the communication between the second port 2c and the port 2d is held cut off by the second spool valvule 6. In consequence, only the first clutch C1 is engaged, and the multiple engagement of the clutches C1 and C2 can be prevented.

Figure 5:
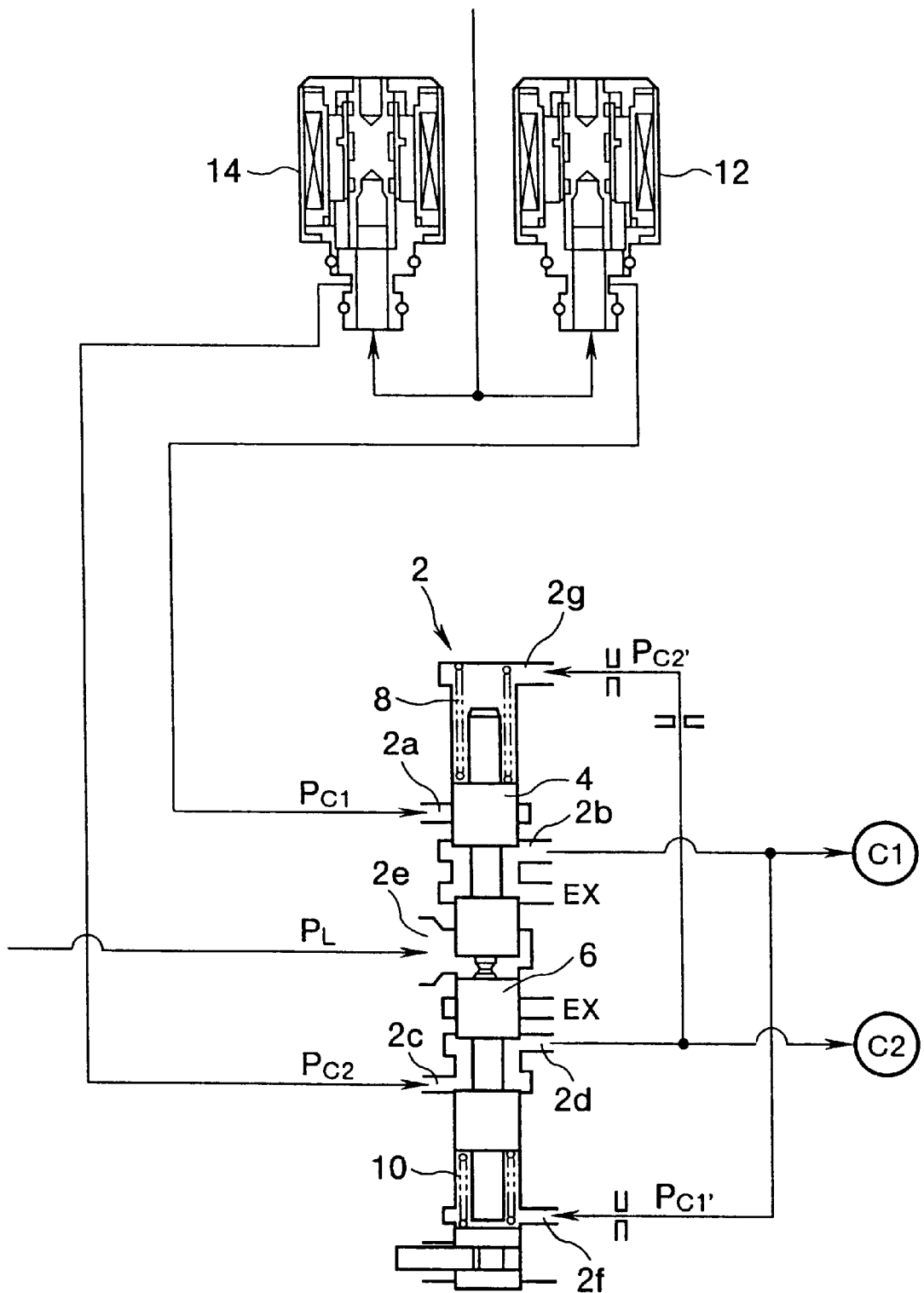
FIG. 5 is a circuit diagram showing the state in which a second clutch is held engaged in the above aspect of performance.

Next, in the engaged state of the second clutch C2, the clutch control pressure PC2' is introduced into the second clutch C2, and the same pressure simultaneously acts on the port 2g. Thus, the first spool valvule 4 is shifted downwards as illustrated in FIG. 5, in conformity with the relational inequality (4) of the forces acting on the first spool valvule 4. Therefore, the communication between the first port 2a and the port 2b is cut off.

That is, when the second clutch C2 is held in the engaged state by the clutch control pressure PC2', the first spool valvule 4 is held at a position adapted to cut off the supply of the clutch control pressure PC1' for the first clutch C1. Further, the first clutch C1 is not engaged, and the second spool valvule 6 is held at a position adapted to supply the clutch control pressure PC2' for the second clutch C2.

Here, even when the solenoid valve 12 has failed, the clutch control pressure PC1 is not supplied to the first clutch C1. In consequence, only the second clutch C2 is engaged, and the multiple engagement of the clutches C1 and C2 can be prevented.

Next, a case will be explained where the first and second clutches C1, C2 are simultaneously controlled during the transition of a gear shift operation.

In the gear shift operation, the clutch control pressure of the clutch having been engaged till now is gradually lowered, and the clutch control pressure of the clutch having been disengaged till now is gradually heightened instead. Such variations in the clutch control pressures (PC1', PC2') are accomplished by the ON/OFF duty controls of the solenoid valves 12 and 14.

During the transition of the gear shift operation, accordingly, the clutch control pressures PC1' and PC2' are not constant, but they are varying. Meantime, the forces acting on the first and second spool valvules 4 and 6 meet the following relational inequalities (7) and (8):

$$Fp1 > Fsp2 + Fpc1' \qquad (7)$$

$$Fp1 > Fsp1 + Fpc2' \qquad (8)$$

Therefore, the pressing force Fp1 based on the line pressure $P_L$ acts to shift the first spool valvule 4 upwards and the second spool valvule 6 downwards as shown in FIG. 3. In consequence, the first port 2a and port 2b of the switchover valve assembly 2, and the second port 2c and port 2d thereof are respectively brought into communication. Thus, the clutch control pressures PC1' and PC2' are respectively supplied to the first clutch C1 and second clutch C2, and the two clutches C1 and C2 are simultaneously controlled.

On this occasion, in a case where the first clutch C1 has gained the power transmission capability, the relation of the forces acting on the second spool valvule 6 meets the inequality (3), and the state of FIG. 4 is established to cut off the supply of the clutch control pressure PC2' for the second clutch C2.

On the other hand, in a case where the second clutch C2 has gained the power transmission capability, the relation of the forces acting on the first spool valvule 4 meets the inequality (4), and the state of FIG. 5 is established to cut off the supply of the clutch control pressure PC1' for the first clutch C1.

Further, in a case where the state of FIG. 3 has been followed by the state in which the respective clutches C1 and C2 are simultaneously supplied with the clutch control pressures PC1' and PC2' permitting them to have the power transmission capabilities, the forces acting on the first and second spool valvules 4, 6 meet the following inequality (9) on condition that the urging forces of the first and second springs 8, 10 are set so as to satisfy the relation indicated by the inequality (5):

$$Fsp1 + Fpc2' < Fsp2 + Fpc1' \qquad (9)$$

Therefore, both the first and second spool valvules 4, 6 are shifted upwards (as viewed in FIG. 3) until the state of FIG. 4 is established. Accordingly, the communication between the second port 2c and port 2d of the switchover valve assembly 2 is cut off, and the supply of the clutch control pressure PC2' for the second clutch C2 is cut off.

To the contrary, on condition that the urging forces of the first and second springs 8, 10 are set so as to satisfy the relation indicated by the inequality (6), the forces acting on the first and second spool valvules 4, 6 meet the following inequality (10):

$$Fsp1 + Fpc2' > Fsp2 + Ppc1' \qquad (10)$$

Therefore, both the first and second spool valvules 4, 6 are shifted downwards (as viewed in FIG. 3) until the state of FIG. 5 is established. Accordingly, the communication between the first port 2a and port 2b of the switchover valve assembly 2 is cut off, and the supply of the clutch control pressure PC1' for the first clutch C1 is cut off.

As thus far described, except for the transition of the gear shift operation, in this aspect of performance, when one of the clutches has the power transmission capability, the supply of the clutch control pressure for the other clutch is cut off. Thus, even in a case, for example, where the solenoid valve 12 or 14, which is the supply source of the clutch control pressure, has failed due to breaking of wire in the course of the drive of the motor vehicle and where both the clutches C1 and C2 are supplied with the clutch control pressures, it is prevented the clutch other than the clutch constituting the current gear shift stage from having the power transmission capability. In this way, the multiple engagement of the clutches can be prevented, and the current gear shift stage can be held.

Besides, during the transition of the gear shift operation, the clutch control pressures PC1' and PC2' can be supplied to both the clutches C1 and C2 as stated above. It is therefore possible to simultaneously control the clutches in the gear shift operation.

Moreover, even in a case where the motor vehicle is driven with the current gear shift stage kept due to the failure of the solenoid valve 12 or 14, where the clutch of the current gear shift stage is thereafter released by stopping the engine of the motor vehicle or setting the drive range thereof at its neutral position, and where the clutch is thereafter engaged again, the multiple engagement of the clutches can be prevented, and the motor vehicle can be driven with the starting gear shift stage at the time of the failure. It is accordingly possible to effectively prevent the lock of the motor vehicle and the burning of the clutches attributed to the multiple clutch engagement.

By the way, in this aspect of performance, the hydraulic control system has the construction in which the difference is bestowed on the urging forces of the first and second springs 8, 10 as indicated by the inequality (5) or (6). However, a similar effect can be attained even when a difference is set between those pressure receiving areas of the first and second spool valvules 4, 6 on which the clutch control pressures act.

As described above, according to the present invention, the supply and cutoff of clutch control pressures for individual clutches are controlled by the function of a switchover valve including two spool valvules, whereby the multiple engagement of the clutches can be prevented.

What is claimed is:

1. A hydraulic control system for an automatic transmission having at least two power transmission shafts, and clutches which are engageable in response to application of a hydraulic pressure thereto to selectively connect one of the power transmission shafts to a power transmission path, comprising:

a first switchover valve connected to supply hydraulic fluid to one of said clutches, said first switchover valve having a spool positioned in a hydraulic fluid supply position for supplying the hydraulic fluid to the one of the clutches and movable to a hydraulic fluid cutoff position;

a second switchover valve connected to supply hydraulic fluid to another of said clutches, said second switchover valve having a spool positioned in a hydraulic fluid supply position for supplying the hydraulic fluid to the another of the clutches and movable to a hydraulic fluid cutoff position;

a first duty controlled solenoid valve controllable to selectively supply the hydraulic fluid supplied to said one of said clutches to said first switchover valve;

a second duty controlled solenoid valve controllable to selectively supply the hydraulic fluid supplied to said another of said clutches to said second switchover valve; and means for moving the spool of the second switchover valve to the hydraulic fluid cutoff position when said first duty controlled solenoid valve selectively supplies the hydraulic fluid supplied to said one of said clutches to said first switchover valve, and for moving the spool of the first switchover valve to the hydraulic fluid cutoff position when said second duty controlled solenoid valve selectively supplies the hydraulic fluid supplied to said another of said clutches to said second switchover valve, so that a malfunction of one of said solenoid valves will not cause a simultaneous engagement of the one and the another of the clutches.

2. The hydraulic control system of claim 1, wherein said first and second duty controlled solenoid valves are normally open solenoid valves.

3. The hydraulic control system of claim 1, wherein the spool of said first switchover valve is biased by a first spring, and the spool of said second switchover valve is biased by a second spring, and wherein a spring force of said first spring is different from a spring force of said second spring.

* * * * *